United States Patent [19]

Lizdas

[11] 4,382,432
[45] May 10, 1983

[54] BARBECUE GRILL WITH VERTICALLY ADJUSTABLE GRATE

[76] Inventor: Thomas E. Lizdas, 1 Mardale R.R. 4, Paris, Ill. 61944

[21] Appl. No.: 27,300
[22] Filed: Apr. 5, 1979
[51] Int. Cl.³ .............................................. A47J 37/00
[52] U.S. Cl. ................................................ 126/25 A
[58] Field of Search ............................ 126/25 R, 25 A

[56] References Cited

U.S. PATENT DOCUMENTS 3,217,634 11/1965 Fox .................................... 126/25 A
3,688,758 9/1972 Stephen ............................ 126/41 R
3,696,800 10/1972 Close ................................ 126/25 A Primary Examiner—Carroll B. Dority, Jr.

[57] ABSTRACT

An outdoor barbecue grill is provided which includes a kettle, grill means supported in an upper interior portion of the kettle, a grate positioned in the interior of the kettle below the grill, and an ash pan positioned in the interior of the kettle below the grate. The coal-bearing grate is movable vertically to control the intensity of the heat that is applied to the foodstuff to be cooked.

9 Claims, 5 Drawing Figures

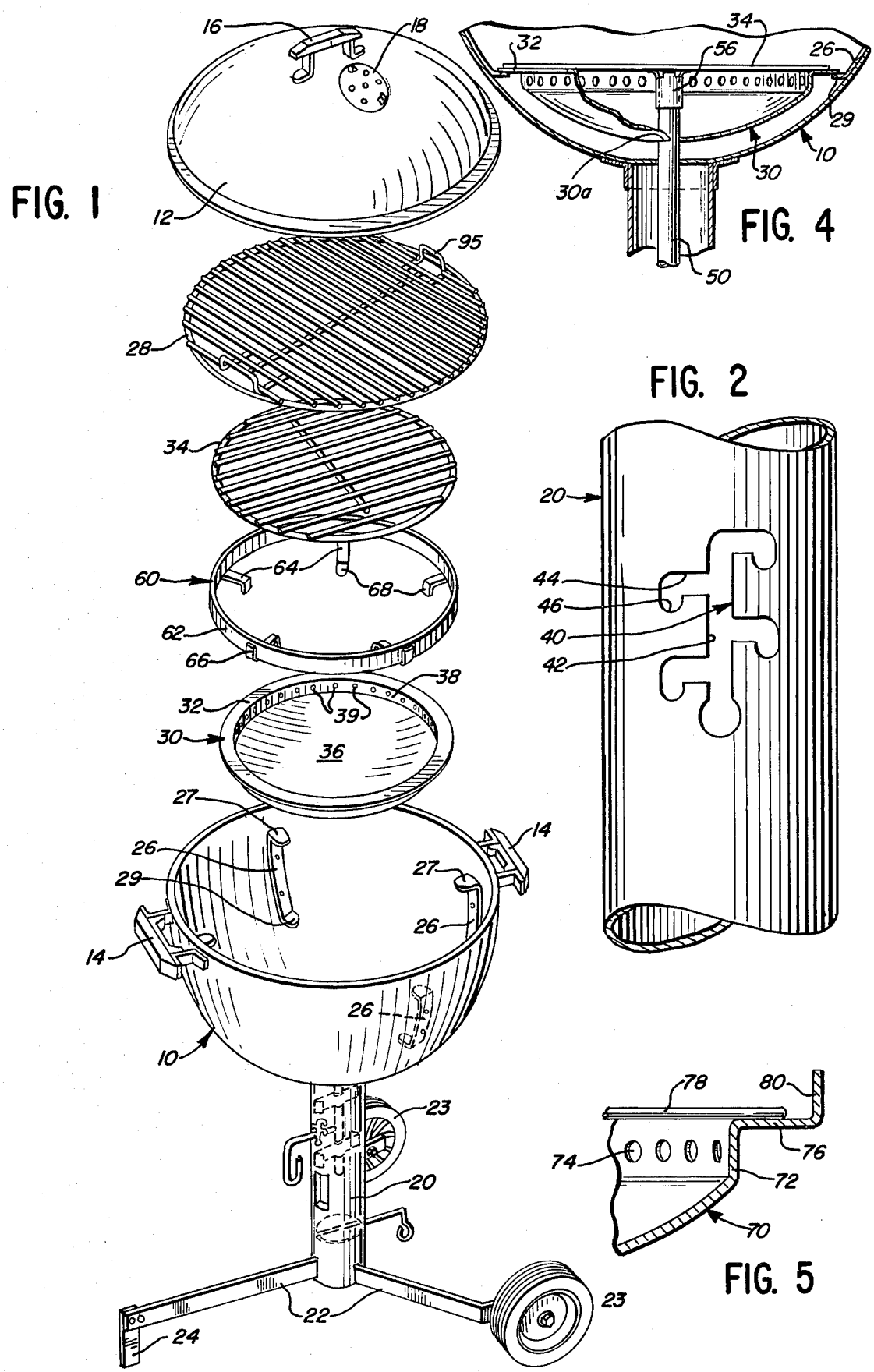

BARBECUE GRILL WITH VERTICALLY ADJUSTABLE GRATE

This invention relates to an outdoor barbecue grill, and in particular one in which the distance between the grate that supports the hot coals and the grill that supports the meat or other foodstuffs to be cooked is vertically adjustable.

A large number of outdoor barbecue grills for cooking meat or other foodstuffs over a bed of hot coals are known in the prior art. Many of these include kettle means for containing the foodstuff to be cooked and the hot coals for cooking the same, and a cover means for the kettle to retain the heat therein. In the prior art constructions, the grate and grill are typically at fixed locations which cannot be conveniently adjusted, with the disadvantage that the intensity of the heat which is generated by the burning coals with respect to the foodstuff cannot be easily controlled.

In an attempt to overcome the foregoing problem, various arrangements have been devised for adjusting the distance between the grate and the grill. For example, U.S. Pat. No. 2,943,557 to Suehlsen discloses a barbecue grill in which the charcoal is held in a firebox that is vertically adjustable. The firebox is supported by a plate that rests on an arcuate edge surface of a support arm that has an opposite end pivotally mounted to the frame of the barbecue grill, and an adjustable notched handle is pivotally connected to the end of the support arm which has the arcuate edge. The notches engage a horizontal bar that extends between two legs of the frame. By manipulating the handle, the elevation of the firebox can be adjusted. This arrangement—all of which is located outside the main body of the apparatus—is relatively complicated and expensive, involves undesirable outwardly extending projections, and could not be readily adjusted for careful control of the amount of air that enters the barbecue kettle.

Another attempted solution is shown in U.S. Pat. No. 3,526,217 to Garske et al. in which the charcoal pan and the cooking utensil are both vertically adjustable by means of friction locking devices that releasably engage a vertical post that has one end supported in the ground. The Garske et al. device, however, makes no attempt to control the amount of air that reaches the burning coals. If one sought to use the friction locking devices of this grill in a kettle grill, additional openings would be required in the side wall of the kettle, which would interfere with controlling the amount of air introduced into the kettle.

A further means of providing variations in the distance between a grate and a grill is disclosed in U.S. Pat. No. 3,247,827 to Cremer. According to the Cremer patent, an adjustment mechanism includes a handle that extends radially outwardly from the barbecue device and has one end that contacts the bottom of a shaft that supports the firebox. By manipulating the handle, the shaft and firebox are moved vertically relative to the foodstuff which is to be cooked. This arrangement is also unsuitable for use with a barbecue kettle because it is undesirable to have a handle projecting radially outwardly from the kettle.

U.S. Pat. No. 3,217,634 to Fox discloses a multiple function portable cooking apparatus in which a linkage mechanism is provided for raising the entire upper portion of the apparatus to enable foodstuffs to be placed in the lower portion of the apparatus. The linkage mechanism includes a lever arm that projects outwardly from the apparatus, and the lever arm coacts with a second lever arm and a pair of rocker arms for raising or lowering the upper portion of the apparatus. The grill which supports the foodstuff to be cooked is also vertically adjustable into different notches that are provided in three elements positioned in the apparatus. The foregoing arrangement is disadvantageous because the lever projects outwardly from the apparatus, and it is not suitable for use in adjusting the elevation of a grate within a kettle.

A gas fired barbecue grill in which the burner unit of a grill is vertically adjustable is shown in U.S. Pat. No. 3,688,758 to Stephen. A slot is provided in the wall of the post that supports the kettle. A tube is slidable within the post, and a handle is secured to the tube and extends through the slot. By moving the handle along the slot, the burner unit is movable vertically. A conical baffle is positioned above the burner unit to direct the flames outwardly. In a lower position, the conical baffle of the burner unit engages the inside edge of a stationary baffle that has a central opening and extends to the side wall of the kettle, so that the flame is prevented by the baffles from rising above the baffles; this represents an indirect-fired mode of cooking with a gas fired barbecue that is said to be advantageous for cooking large chunks of meat, such as turkey or beef roasts. When the burner unit is raised to the upper position, the flame from the burner is directed above the stationary baffle for cooking by the direct-fired mode. Accordingly, only two positions are contemplated, and the purpose of the vertical movement is to provide alternate paths for the flames for two different modes of cooking. Once a cooking mode is selected, the intensity of the heat cannot be adjusted by moving the burner unit vertically relative to the grill.

SUMMARY OF THE INVENTION

The foregoing disadvantages are avoided by the barbecue grill of the present invention which cooks meat or other foodstuffs over a bed of hot coals and includes means for vertically adjusting a grate relative to a grill that is supported in an upper interior portion of the kettle.

The kettle is supported in an elevated position by a support means, such as a hollow column, that defines a slot having a vertically extending segment and at least one generally horizontally extending segment that communicates with the vertical segment. An ash pan is adapted for positioning in the interior of the kettle below the grate, and the grate is positioned in the interior of the kettle below the grill which is supported in an upper interior portion of the kettle.

A generally vertical post member is positioned adjacent the support means. Generally horizontal handle means has one end secured to the post member, a midportion that extends through the slot, and an opposite end which extends away from the support means and is grippable by a user.

The post member has an upper end that engages either the ash pan or the grate. The element that is not supported in this way is supported by (1) a lower interior portion of the kettle when that other element is the ash pan, and (2) by the ash pan when the other element is the grate. Preferably, the upper end of the vertical post member is secured to the ash pan, and the grate is supported by the ash pan.

As a result of this construction, the grate can be vertically adjusted in relation to the grill by moving the handle means in the slot from a first position at a predetermined height to a second position at a different predetermined height.

To prevent coals from rolling off the grate, particularly when the grate is in the upper position, a ring member is provided and is supported by the ash pan. The ring member has an upstanding generally vertical wall that extends above the elevation of the grate for retaining the coals on the grate.

With the barbecue grill of the present invention, the intensity of the heat on the foodstuff to be cooked is controllable in a relatively easy and convenient manner by adjusting the elevation of the grate in any one of a plurality of positions that are provided.

BRIEF DESCRIPTION OF DRAWINGS

The invention will now be described with reference to the attached drawing, in which:

FIG. 1 is an exploded perspective view of the outdoor barbecue grill of this invention;

FIG. 2 is a fragmentary elevational view on an enlarged scale of the member which supports the barbecue kettle in an elevated position;

FIG. 4 is a fragmentary cross-sectional view of an alternative embodiment of the member which supports the barbecue kettle in an elevated position; and FIG. 5 is a fragmentary cross-sectional view of an alternative embodiment of a grate and ash pan for the barbecue grill of the present invention.

DETAILED DESCRIPTION OF THE PREFERRED EMBODIMENTS

Figure 3:
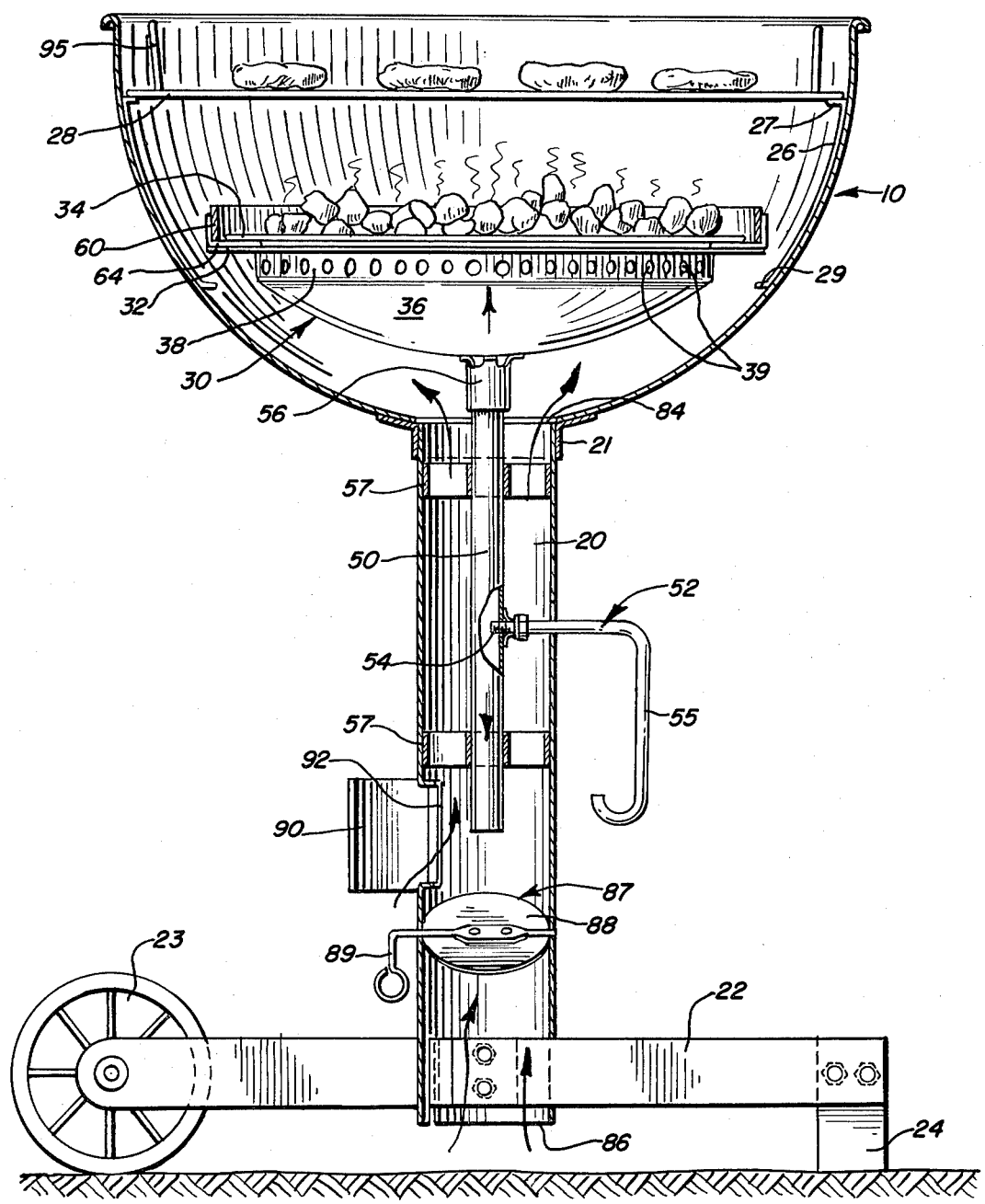
FIG. 3 is a cross-sectional view of the assembled barbecue grill, with the lid or cover means omitted and the vertical post member partially broken away for clarity.

In the preferred embodiment which is illustrated in FIG. 1, kettle means 10 having lid or cover means 12 is provided for containing the hot coals and the foodstuff to be cooked. Kettle 10 is provided with handles 14 and lid 12 with handle 16.

Lid 12 is provided with draft vents and vent cover 18 through which heated air and fumes escape from the kettle when it is covered by lid 12. As described below, draft means is provided in the bottom wall of kettle 10 through which fresh air to support the combustion of the charcoal is drawn during use of the grill.

In the embodiment shown, the kettle 10 is supported in an elevated position by generally vertically extending support means 20 which preferably is a hollow column. The upper end of the column is secured to the bottom wall of the kettle 10 by means of a flanged sleeve 21 (FIG. 3) that has its tubular portion secured to the column and its flanged rim secured to the bottom wall of the kettle. Three legs 22 are secured to a lower portion of the column. For convenience, two of the legs terminate in wheels 23, upon which the barbecue grill may be rolled from one position to another when the other leg 22, terminating in a foot 24 of plastic, metal or other suitable material, is raised off the ground.

Brackets 26 are secured to the inner surface of the side wall of kettle 10, to support the wire grill 28 upon which the foodstuff to be cooked is placed. Horizontally extending upper finger 27 of each bracket provides support for the wire grill 28. Although not required in the preferred embodiment, the bracket may further include horizontally extending lower fingers 29 to support the ash pan 30. The ash pan has an outwardly extending flange 32 that is adapted for resting upon fingers 29.

Grill means 28 is supported in the upper interior portion of kettle 10. Ash pan 30 is supported, as best seen in FIG. 3, in the interior of kettle 10 below grill 28. Grate means 34 supports the bed of hot coals and preferably is supported by the outwardly extending flange 32 of ash pan 30, and as thus supported is spaced below grill 28.

In use, charcoal briquettes are supported on grate 34, lighted, and brought to the required state of a bed of glowing coals. The foodstuff to be cooked is placed upon wire grill 28 above the bed of hot coals.

Ash pan 30 has an imperforate bottom wall 36. Its side wall 38 defines a plurality of draft vents 39 through which air can move across the bed of hot coals. When burning coals are present on grate 34, the convection currents of hot air rising from the hot coals draw drafts of fresh air inwardly through the vents in the bottom wall of kettle 10 and vents 39 in the side wall 38 of ash pan 30, and thence through and across the bed of hot coals, to support the combustion of the charcoal. Only a relatively insignificant portion, if any, of the ash resulting from the burning of the charcoal may filter between ash pan 30 and the side walls of kettle 10 or out through vent holes 39.

In accordance with the present invention, the grate 34 is vertically adjustable relative to the grill 28 for varying the intensity of the heat on the foodstuff which is supported by the grill 28. In order to accomplish this, the support means 20 defines a slot 40, which is best seen in FIG. 2. The slot 40 includes a generally vertically extending segment 42, and at least one generally horizontally extending segment 44. In the illustrated embodiment, four horizontal segments 44 are shown, although a greater or lesser number can be used. Preferably, each horizontal segment terminates in a short downwardly extending segment 46.

As shown in FIG. 3, a post member 50 is positioned adjacent to the support means 20, and preferably is disposed within the support means 20. Handle means 52 has one end secured to a midportion of the post member, as by threaded means 54. Handle 52 is generally horizontal and includes a midportion that extends through the slot 40. Thus, the diameter of the handle 52 is no greater than the width of slot 40. The handle 52 further includes an opposite end which extends away from the support means 20, and which may include a generally vertical portion 55 so that it is easily grippable by a user.

In the preferred embodiment, the upper end of the post member 50 engages the bottom wall 36 of the ash pan 30. As illustrated in FIG. 3, the upper end of the post member 50 is slidably received in a socket 56 that has a vertical wall with an inner diameter slightly greater than the outer diameter of the post member, and a generally horizontal wall that is secured to the bottom wall 36 of the ash pan 30. Accordingly, the ash pan is removable from the post member by lifting the ash pan. For a more positive securement between the ash pan and the post member, a horizontally disposed thumb screw (not shown) can be inserted in a threaded opening (not shown) provided in the vertical wall of the socket 56.

Referring to FIGS. 1 and 2, the grate 34 is vertically adjustable relative to the grill 28 by moving the handle 52 in slot 40 from a first position at a predetermined height to a second position at a different predetermined height. Since the ends of the horizontal segments 44 have a downwardly extending portion 46, the handle 52 is locked in position by the force of gravity until the user lifts the handle 52 to adjust the height of the grate 34. Movement of the handle correspondingly moves the grate 34 because the handle is secured to the post member 50 which is in engagement with the ash pan 30 and, in the preferred embodiment, the grate 34 is supported by the ash pan 30.

Preferably, the outer diameter of the post member 50 is no greater than one-half of the inside diameter of the column 20. To maintain the post member in the desired generally vertical orientation, at least two spaced apart brackets 57 are provided. Each guide bracket is positioned in the column 20 and has opposing ends which are secured to the inside surface of the column 20, and defines a through aperture having an inside diameter at least as large and approximately equal to the outer diameter of the post member 50. The post member is received in the apertures defined by the brackets and is movable vertically relative to the brackets.

An alternative embodiment is shown in FIG. 4. In this embodiment, the post member 50 is secured directly to the grate means 34 by means of socket 56, with a through aperture 30a being provided in the bottom wall of the ash pan 30 through which the post member 50 extends. The ash pan 30 is supported by having flange 32 engaging and resting upon the horizontally extending lower fingers 29 of the bracket 26.

The alternative embodiment operates similar to the embodiment illustrated in FIGS. 1 through 3, with movement of the handle vertically causing a corresponding vertical movement of the grate means. However, in the embodiment shown in FIGS. 1 through 3, the post member engages the ash pan on which the grate means is supported. In the alternate embodiment, on the other hand, the ash pan remains at the same elevation at all times since it is supported by the fingers 29, and the post member directly engages the grate means.

A further feature of the present invention is the use of means for retaining the hot charcoals on the grate, so that the charcoals are prevented from rolling off the grate and down the wall of the kettle 10. This potential problem is of particular importance where the grate is in a raised position in which there is a space between the outer edge of the grate and the wall of the kettle due to the curvature of the kettle wall, as shown in FIG. 3.

The retaining means preferably comprises a ring member 60 (FIG. 1) that includes an upstanding generally vertical wall 62. The ring member further includes a plurality of legs which each have an inwardly extending generally horizontal segment 64, an upstanding flange 66 at one end of the horizontal segment that is secured to the outer surface of the vertical wall 62, and a downwardly directed generally vertical flange 68 at the opposite end of the horizontal segment 64.

As shown in FIG. 3, the ring member 60 is supported by the ash pan 30, with the bottom surface of the horizontal segments 64 engaging the upper surface of the outwardly extending flange 32 of the ash pan. The vertical flanges 68 are locator means which prevent relative movement between the ash pan 30 and ring member 60 in the horizontal plane.

The internal diameter of the vertical wall 62 is at least as great and about equal to the outer diameter of the grate 34. Since the grate engages and is supported by the upper surface of the horizontal segments 64, the vertical wall 62 extends above the height of the grate. Accordingly, the ring member 60 prevents the charcoals from rolling off the grate 34.

Another embodiment of the retaining means is depicted in FIG. 5. In this embodiment, ash pan 70 has a side wall 72 that defines a plurality of draft vents 74 through which air can move across the bed of hot coals. Ash pan 70 also includes an outwardly extending flange 76 on which grate means 78 is supported. The outer end of the flange 76 is turned upwardly to define an upstanding generally vertical wall 80 which comprises the charcoal retaining means. The inner diameter of vertical wall 80 is at least as great and about equal to the outer diameter of the grate 34 so that the vertical wall contains the charcoals on the grate.

With the present invention, draft means is provided in the bottom wall of kettle 10 to support the combustion of charcoal. Instead of the conventional draft vents which are typically provided in the bottom wall of a kettle, an opening 84 is provided in the bottom wall of the kettle, with the diameter of the opening approximately equalling the inner diameter of the hollow column 20 (FIG. 3).

Column 20 defines an opening 86 at the bottom end thereof, and air enters opening 86, rises through the column, and enters the kettle through opening 84.

Means is provided for adjusting the amount of air that travels through the column 20 to the kettle. As shown in FIG. 3, the adjustment means includes a first gate 87 that includes a cylindrical plate 88 having a handle 89 that is secured to the plate 88 and extends through the wall of the column. The plate 88 has a diameter approximately equal to the inner diameter of the column, and by rotating the handle 89, the gate 87 is movable between a vertical open position in which the maximum amount of air travels through the column and a horizontal closed position in which little or no air travels through the column. There are intermediate positions between the open and closed positions in which varying amounts of air travel through the column.

The means for adjusting the amount of air that travels through the column 20 further includes a second gate 90 that is positioned adjacent to an opening 92 defined in the wall of the column 20. The gate 90 is shown in FIG. 3 and is pivotable about a vertical axis. The gate is movable between the open position that is illustrated in which the maximum amount of air enters the column, and a closed position in which little or no air enters the column. There are also intermediate positions between the open and closed positions in which varying amounts of air enter the column through the opening 92.

As will be seen, grill 28 may be removed from the interior of kettle 10 by means of handles 95 on opposite sides of the grill. Grate 34 and ash pan 30 are likewise separately removable from kettle 10 for cleaning and other maintenance. The latter two elements may be removed by hand, or may if desired be removed by employing a pair of hooklike instruments that may be inserted beneath the individual wires of grate 34 or into the individual vent holes 40 of ash pan 30. In either case, the ashes and unburned charcoal can be reliably removed from kettle 10 without any spilling or attendant mess that accompanies the use of many of the prior art barbecue grills.

If desired, by use of the hooklike instruments referred to just above, ash pan 30 may be removed from kettle 10 with grate 34 resting upon it. In this case, the ash pan, grate and unburned charcoal and ashes may be carried together to the point of disposal of the ashes and other waste.

Whether grate 34 and ash pan 30 are removed from kettle 10 separately or together, when the point of disposal is reached the grate can be removed altogether from the ash pan, and thus the contents of the ash pan may all be discarded without any problem of having some portions of unburned charcoal remain wedged between the grate and ash pan in a position from which it is difficult to remove such debris.

As is seen from the drawing, in the embodiment disclosed kettle means 10 is generally hemispherical in shape. The grill 28, grate 34, and ash pan 30 are each circular in shape. As a result, the bed of coals can be distributed symetrically about the center of grate 34. Thus the heating power of the bed of coals is uniform around the entire 360° of the bed of coals.

Similarly, the foodstuff to be cooked can be distributed symetrically about the center of grill 28. It follows that the foodstuff may be heated uniformly around the 360° of the grill.

The above detailed description of this invention has been given for clarity of understanding only. No unnecessary limitations should be understood therefrom, as modifications will be obvious to those skilled in the art.

What is claimed is:

1. An outdoor barbecue grill for cooking meat or other foodstuffs over a bed of hot coals, which comprises:

kettle means for containing the foodstuffs to be cooked and the hot coals for cooking the same;
   grill means supported by the said kettle in the upper interior portion thereof;
   generally vertical support means for supporting said kettle in an elevated position, said support means defining a slot, said slot including a generally vertically extending segment and at least one generally horizontally extending segment communicating with said vertical segment;
   grate means adapted for positioning in the interior of said kettle below said grill means;
   an ash pan adapted for positioning in the interior of said kettle below said grate means;
   a generally vertical post member positioned adjacent said support means, generally horizontal handle means having one end secured to said post member, a midportion that extends through said slot, and an opposite end which extends away from said support means and is grippable by a user;
   said post member having an upper end that engages either said ash pan or said grate means, the one of said ash pan and said grate means that is not so engaged being supported by (1) a lower interior portion of the kettle means where said non-engaged element is the ash pan and (2) the ash pan where said non-engaged element is the grate means,
   whereby said grate means is vertically adjustable relative to said grill means by moving said handle means in said slot from a first position at a predetermined height to a second position at a different predetermined height.

2. The outdoor barbecue grill of claim 1 in which said upper end of said vertical post member is secured to said ash pan and said grate means is supported by said ash pan.

3. The outdoor barbecue grill of claim 2 in which said vertical support means is a hollow column and said post member is disposed within said column.

4. The outdoor barbecue grill of claim 3 in which at least two spaced apart guide members are secured to the inside wall of said column, said guide members defining a through aperture having a diameter at least as large and approximately equal to the outside diameter of said post member, whereby said guide members limit the transverse movement of said post member.

5. The outdoor barbecue grill of claim 1 in which said kettle means defines at least one draft vent in its bottom wall.

6. The outdoor barbecue grill of claim 1 in which a ring member is supported by said ash pan, said ring member having an upstanding generally vertical wall that extends above the elevation of said grate means, the internal diameter of said wall being greater than the diameter of said grate means, whereby said vertical wall prevents the coals that are positioned on said grate means from rolling off said grate means.

7. The outdoor barbecue grill of claim 1 in which said ash pan includes an upstanding generally vertical wall that extends above the height of said grate means, whereby said vertical wall prevents coals that are positioned on said grate means from rolling off said grate means.

8. An outdoor barbecue grill for cooking meat or other foodstuffs over a bed of hot coals, which comprises:

kettle means for containing the foodstuffs to be cooked and the hot coals for cooking the same;
   grill means supported by said kettle in the upper interior portion thereof;
   generally vertical support means comprising a hollow column for supporting said kettle in an elevated position, said support means defining a slot in the wall of said column, said slot including a generally vertically extending segment and at least one generally horizontally extending segment communicating with said vertical segment;
   grate means adapted for positioning in the interior of said kettle below said grill means for supporting said bed of hot coals;
   an ash pan adapted for positioning in the interior of said kettle below said grate means;
   a generally vertical post member positioned within said support means, generally horizontal handle means having one end secured to said post member, a midportion that extends through said slot, and an opposite end which extends away from said support means and is grippable by a user;
   said post member having an upper end that engages said ash pan, said grate means being supported by the ash pan,
   whereby said grate means is vertically adjustable relative to said grill means by moving said handle means in said slot from a first position at a predetermined height to a second position at a different predetermined height.

9. An outdoor barbecue grill for cooking meat or other foodstuffs over a bed of hot coals, which comprises:

kettle means for containing the foodstuffs to be cooked and the hot coals for cooking the same;
   grill means supported by said kettle in the upper interior portion thereof;

generally vertical support means for supporting said kettle in an elevated position, said support means defining a slot, said slot including a generally vertically extending segment and at least one generally horizontally extending segment communicating with said vertical segment;

grate means adapted for positioning in the interior of said kettle below said grill means;

an ash pan adapted for positioning in the interior of said kettle below said grate means, said ash pan including support means for engaging and supporting said grate means, and said ash pan further including an upstanding generally vertical wall which extends above the height of said grate means and has an internal diameter at least as great and about equal to the outer diameter of said grate means;

a generally vertical post member positioned adjacent said support means, generally horizontal handle means having one end secured to said post member, a midportion that extends through said slot, and an opposite end which extends away from said support means and is grippable by a user;

said post member having an upper end that engages one of said ash pan and said grate means, the other of said ash pan and said grate means being supported by (1) a lower interior portion of the kettle means where said other element is the ash pan and (2) the ash pan where said other element is the grate means, whereby said grate means is vertically adjustable relative to said grill means by moving said handle means in said slot from a first position at a predetermined height to a second position at a different predetermined height and said vertical wall prevents the coals on said grate means from rolling off said grate means.

* * * * *